United States Patent [19]

Kalthoff et al.

[11] Patent Number: 5,070,931
[45] Date of Patent: Dec. 10, 1991

[54] TEMPERATURE CONTROL UNIT FOR A MOTOR VEHICLE

[75] Inventors: Gerd-Otto Kalthoff, Erlangen; Thomas Hartleb, Meeder

[73] Assignee: Siemens Aktiengesellschaft, Berlin & Munich, Fed. Rep. of Germany

[21] Appl. No.: 575,410

[22] Filed: Aug. 29, 1990

[30] Foreign Application Priority Data

Aug. 31, 1989 [EP] European Pat. Off. ........ 89116122.6

[51] Int. Cl.$^5$ .............................................. B60H 1/00
[52] U.S. Cl. ..................................... 165/11.1; 165/12; 165/42; 165/43; 236/94; 62/127; 237/12.3 B; 237/2 A
[58] Field of Search ............... 165/11.1, 12, 42, 43; 236/94; 62/127; 237/12.3 B, 2 A

[56] References Cited

U.S. PATENT DOCUMENTS 4,222,435  9/1980  Kumagai ............................ 165/11
4,478,274 10/1984  Naganoma et al. ................ 165/12

FOREIGN PATENT DOCUMENTS 0050331  4/1982  European Pat. Off. .
0184621  6/1986  European Pat. Off. .
2523904  9/1983  France .

Primary Examiner—John Ford
Attorney, Agent, or Firm—Kenyon & Kenyon

[57] ABSTRACT

A temperature control unit has an air distribution setting device, an air volume setting device and a regulating control unit which determined optimum settings for the air distribution setting device and for the air volume setting device. The unit also includes a desired temperature setting device supplying a nominal inside temperature to the regulating control unit. Sensors provide an input indicative of the actual inside tempertaure to the regulating contol unit. Output indicators, preferably in the form of light emitting diodes disposed along selecting paths of the setting devices indicate to the operator the calculated optimum settings for the appropriate setting device device to be selected to allow for a controlled, external adjustment of the air distribution setting device and of the air volume setting device.

20 Claims, 1 Drawing Sheet

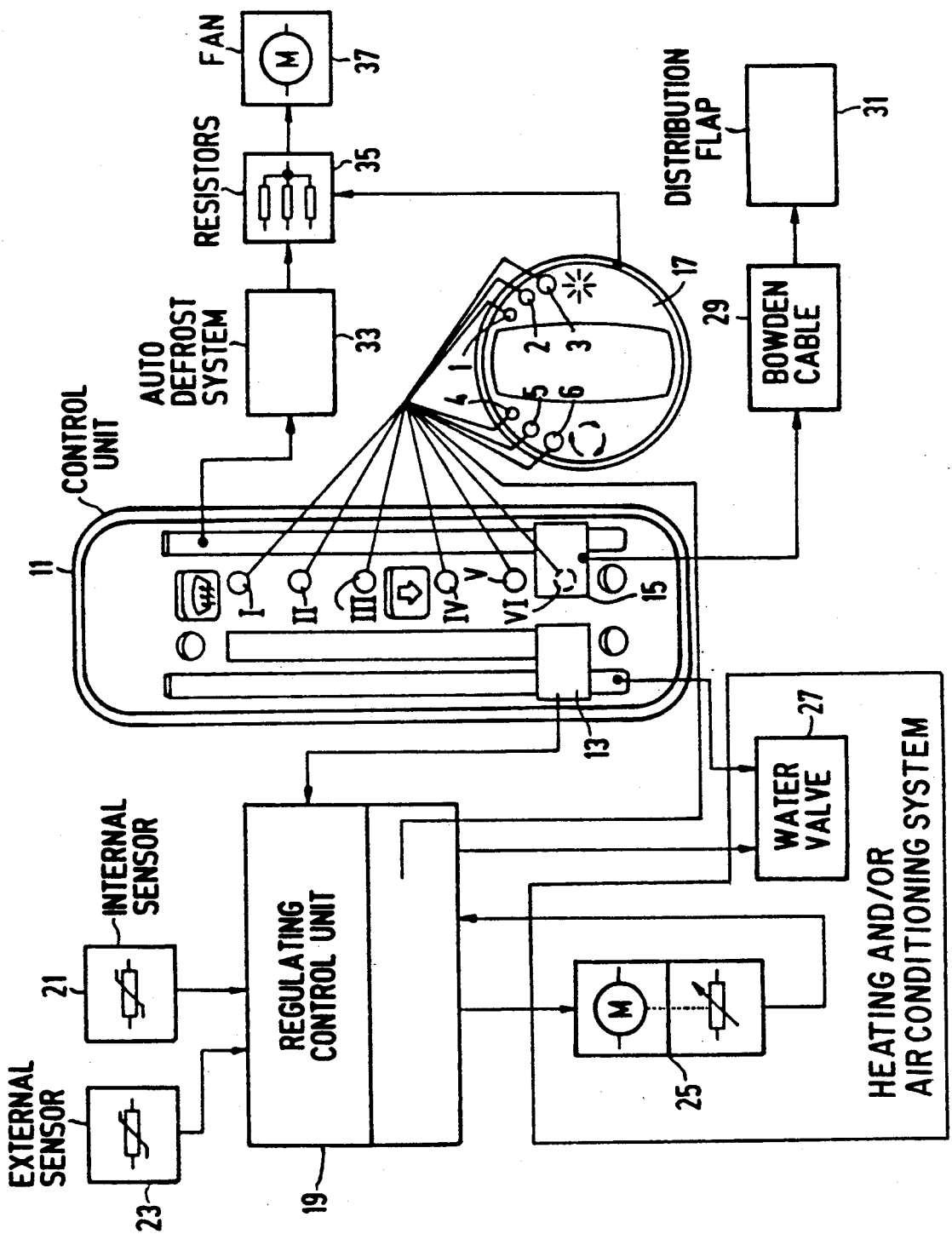

TEMPERATURE CONTROL UNIT FOR A MOTOR VEHICLE

BACKGROUND OF THE INVENTION

This invention relates generally to temperature control i.e., heating and/or air conditioning units for motor vehicles and, more particularly, to an improved temperature control unit having an air distribution setting device, an air volume setting device and a regulating control unit, wherein optimum settings are calculated and displayed but not automatically implemented.

A known temperature control unit for a motor vehicle calculates the optimum settings for air distribution and air volume using automatic control electronics based on a defined inside temperature and considering various actual values, such as the outside temperature and the prevailing inside temperature. The settings are automatically adjusted via downstream actuators and drivers. This known type of system is complex.

Therefore a temperature control unit which entails less complexity, compared to the known fully automatic temperature control unit is needed. This temperature control unit should include important advantages of automatic control yet not preclude individual control of the air distribution and/or air volume.

SUMMARY OF THE INVENTION

According to the present invention, these needs are met by indicating to the operator the optimum settings for air distribution and air volume. This allows for a controlled, external adjustment of the air distribution setting device and the air volume setting device in the operator control panel of the motor vehicle. The calculated settings for a controlled, external adjustment are presented to the operator in a useful way (i.e. in the form of a chain of indicating lamps, in particular light emitting diode displays) in the operator control panel of the motor vehicle.

The temperature control unit can be housed in a motor vehicle with an air distribution setting device and air volume setting device, as well as with a regulating control unit. The regulating control unit determines the optimum setting values for air distribution and air volume based on an operator specified inside temperature using a temperature setting device and based on actual values of the inside and possibly outside temperature.

In a further refinement of the invention, the LED displays are disposed along the selecting path of the air distribution setting device and of the air volume setting device. The LEDs light up next to the calculated optimum setting of the corresponding setting device to be reset. The passenger can thus follow this recommendation on the operator control panel by manually resetting the setting device and thereby selecting the setting which is best suited to his needs and based on the prevailing environmental conditions. The present invention allows the design of the operator control panel to remain essentially unchanged, while saving the operator the high costs of a fully automatic system. On the other hand, independently of a fully automatic system, the passenger can make an individual adjustment which deviates from the system's recommendation and one that will not be changed by the system.

BRIEF DESCRIPTION OF THE DRAWING

The single figure is a schematic block diagram of the present invention.

DETAILED DESCRIPTION

Referring to the figure, a control unit 11 is shown having a temperature setting device 13 and an air distribution setting device 15, each in the form of a sliding setter arranged in the operator control panel of a motor vehicle (e.g. in the dashboard). In addition, the operator control panel contains an air volume setting device 17 in the form of a rotary setter with a sector for fresh air operation and a sector for circulating air operation. The temperature setting device 13 supplies a value specified by the operator as the desired inside temperature of the motor vehicle to a regulating control unit 19 as a nominal value. An internal sensor 21 supplies the current inside temperature and an external sensor 23 supplies the outside temperature to the regulating control 19 unit as actual values. The regulating control unit 19 can be of the type disclosed in U.S. Pat. No. 4,478,274, the disclosure of which is hereby incorporated by reference.

An actuator 25 for an air mix flap, which mixes warm air and cold air in a predetermined way, and a water valve 27 in a heat exchanger of the temperature control unit are actuated based on the values calculated by the regulating control unit 19 and based on the input of the nominal inside temperature and the actual inside and outside temperature. Optimum values for the air distribution and air volume calculated by the regulating control unit 19 are transmitted to a chain of LED displays I–VI along the translatory selecting path of the air distribution setting device 15 and to a chain of LED displays 1–6 along the rotatory selecting path of the air volume setting device 17. Thus, a light emitting diode lights up over the setting position that one must select in order to achieve the optimum air distribution and air volume calculated by the regulating control unit 19.

A fan 37 is actuated at the appropriate rotational speed via the air volume setting device 17 in a generally known way, according to the respective settings of the air volume setting device 17 via series resistors 35. However, the fan 37 may be actuated directly from the air distribution device 15 through an automatic defrost system 33, when using the defrost setting of the air distribution setting device 15. Air distribution is accomplished in a conventional fashion using air distribution flaps 31. The appropriate distribution flap 31 is adjusted via a Bowden cable 29, for distributing the air into the windshield plane, the central plane or the foot plane, depending upon the setting of the air distribution device 15.

The invention was described above with respect to a heating unit. Of course, the principle of the invention is applicable to an air conditioning unit, whereby a cooling compressor is switched on via magnetic coupling instead of the control of a water valve 27.

What is claimed is:

1. A temperature control unit for a motor vehicle compartment, comprising:
   an air distribution setting device cooperating with means for effecting a distribution of air entering the motor vehicle compartment and having a first optimum setting and manually movable over a first selecting path;

an air volume setting device cooperating with means for effecting a volume of air entering the motor vehicle compartment and having a second optimum setting and manually movable over a second selecting path;

a regulating control means determining said first optimum setting for said air distribution setting device and said second optimum setting for said air volume setting device without automatically implementing said first and second optimum settings;

a desired temperature setting device having an output coupled as a first input to said regulating control means supplying a nominal desired inside temperature;

a first plurality of output indicators, indicating the first optimum setting;

a second plurality of output indicators indicating the second optimum setting; and a first sensor providing a second input indicative of the actual inside temperature to said regulating control means, said regulating control unit determining said first and second optimum settings based on said first and second inputs.

2. The temperature control unit according to claim 1 further comprising a second sensor providing a third input indicative of the actual outside temperature to said regulating control means, said regulating control means determining said first and second optimum settings based on said first, second and third inputs.

3. The temperature control unit according to claim 1 wherein said first plurality of output indicators comprise a first plurality of illuminated displays, and said second plurality of output indicators comprise a second plurality of illuminated displays.

4. The temperature control unit according to claim 2 wherein said first plurality of output indicators comprise a first plurality of illuminated displays, and said second plurality of output indicators comprise a second plurality of illuminated displays.

5. The temperature control unit according to claim 1 wherein said first plurality of output indicators comprise a first plurality of light emitting diode displays, and said second plurality of output indicators comprise a second plurality of light emitting diode displays.

6. The temperature control unit according to claim 2 wherein said first plurality of output indicators comprise a first plurality of light emitting diode displays, and said second plurality of output indicators comprise a second plurality of light emitting diode displays.

7. The temperature control unit according to claim 5 wherein said first plurality of light emitting diode displays is disposed along said first selecting path, said first plurality illuminating the first optimum setting to be selected; and said second plurality of light emitting diode displays is disposed along said second selecting path, said second plurality of light emitting diode displays illuminating the second optimum setting to be selected.

8. The temperature control unit according to claim 6 wherein said first plurality of light emitting diode displays is disposed along said first selecting path, said first plurality illuminating the first optimum setting to be selected; and said second plurality of light emitting diode displays is disposed along said second selecting path, said second plurality of light emitting diode displays illuminating the second optimum setting toe be selected.

9. The temperature control nit of claim 1 wherein said temperature control unit further comprises a heating unit.

10. The temperature control unit of claim 1 wherein said temperature control unit further comprises an air conditioning unit.

11. The temperature control unit of claim 1 wherein said temperature control unit further comprises a heating and air conditioning unit.

12. The temperature control unit of claim 2 wherein said temperature control unit further comprises a heating unit.

13. The temperature control unit of claim 2 wherein said temperature control unit further comprises an air conditioning unit.

14. The temperature control unit of claim 2 wherein said temperature control unit further comprises a heating and air conditioning unit.

15. The temperature control unit of claim 3 wherein said temperature control unit further comprises a heating and air conditioning unit.

16. The temperature control unit of claim 4 wherein said temperature control unit further comprises a heating and air conditioning unit.

17. The temperature control unit of claim 5 wherein said temperature control unit further comprises a heating and air conditioning unit.

18. The temperature control unit of claim 6 wherein said temperature control unit further comprises a heating and air conditioning unit.

19. The temperature control unit of claim 7 wherein said temperature control unit further comprises a heating and air conditioning unit.

20. The temperature control unit of claim 8 wherein said temperature control unit further comprises a heating and air conditioning unit.

* * * * *